(12) United States Patent
Lindsay et al.

(10) Patent No.: US 8,398,166 B2
(45) Date of Patent: Mar. 19, 2013

(54) VEHICLE SEAT ASSEMBLY

(75) Inventors: Derek Shane Lindsay, Marysville, OH (US); Terrie Ellison, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 12/722,360

(22) Filed: Mar. 11, 2010

(65) Prior Publication Data
US 2011/0221254 A1    Sep. 15, 2011

(51) Int. Cl.
    *B60N 2/42* (2006.01)
(52) U.S. Cl. ............ 297/216.1; 297/284.11; 297/452.27
(58) Field of Classification Search ............... 297/216.1, 297/284.11, 452.21, 452.26, 452.27
See application file for complete search history.

(56) References Cited

U.S. PATENT DOCUMENTS

| | | | |
|---|---|---|---|
| 2,789,621 A | 4/1957 | Langtry et al. | |
| 3,161,436 A * | 12/1964 | Hood | 297/452.27 |
| 3,612,607 A * | 10/1971 | Lohr | 297/452.27 |
| 3,853,352 A | 12/1974 | Ambrose | |
| 3,915,493 A | 10/1975 | Brown | |
| 4,236,751 A * | 12/1980 | Strien | 297/216.1 |
| 4,521,057 A | 6/1985 | Varterasian et al. | |
| 4,583,781 A | 4/1986 | Hatsutta et al. | |
| 4,583,782 A | 4/1986 | Mikuniya | |
| 4,623,192 A | 11/1986 | Koide et al. | |
| 4,726,086 A | 2/1988 | McEvoy | |
| 4,837,881 A | 6/1989 | Kondo et al. | |
| 4,854,643 A | 8/1989 | Cojocari et al. | |
| 4,916,765 A * | 4/1990 | Castronovo, Jr. | 5/640 |
| 4,930,171 A * | 6/1990 | Frantz | 297/DIG. 1 |
| 5,100,204 A | 3/1992 | Makihara et al. | |
| 5,189,747 A * | 3/1993 | Mundy et al. | 297/452.27 |
| 5,368,368 A | 11/1994 | Fukui et al. | |
| 5,400,490 A | 3/1995 | Burchi | |
| 5,474,362 A * | 12/1995 | Albecker, III | 297/452.32 |
| 5,542,747 A | 8/1996 | Burchi | |
| 5,564,144 A * | 10/1996 | Weingartner et al. | 297/452.27 |
| 5,850,645 A | 12/1998 | Ogawa et al. | |
| 6,226,819 B1 | 5/2001 | Ogawa et al. | |
| 6,481,801 B1 | 11/2002 | Schmale | |
| 6,511,562 B1 | 1/2003 | Coffield | |
| 6,571,411 B1 | 6/2003 | Ebe | |
| 6,625,830 B2 * | 9/2003 | Lampel | 297/452.26 |
| 6,652,034 B1 | 11/2003 | Schramm et al. | |

(Continued)

FOREIGN PATENT DOCUMENTS

| EP | 2123507 | 11/2009 |
|---|---|---|
| FR | 2795371 | 9/2001 |

OTHER PUBLICATIONS

U.S. Appl. No. 12/722,375, filed Mar. 11, 2010 and entitled "Vehicle Seat Assembly".

(Continued)

*Primary Examiner* — Peter R. Brown
(74) *Attorney, Agent, or Firm* — Rankin Hill & Clark LLP

(57) ABSTRACT

A vehicle seat assembly includes a seat back and a seat base extending forward from a lower end of the seat back. The seat base is formed of a first foam member extending laterally across the seat base to absorb loads and a second foam member formed over the first member to form a seating surface of the seat base. The first foam member includes at least one channel for interlocking the first foam member and a second foam member.

18 Claims, 4 Drawing Sheets

U.S. PATENT DOCUMENTS

| | | |
|---|---|---|
| 6,663,178 B2 | 12/2003 | Fourrey et al. |
| 6,755,475 B1 | 6/2004 | Tiesler et al. |
| 6,786,541 B2 | 9/2004 | Haupt et al. |
| 6,854,806 B2 | 2/2005 | Huse |
| 7,008,013 B2 | 3/2006 | Okamoto |
| 8,141,957 B2 * | 3/2012 | McClung et al. ........ 297/452.27 |
| 2004/0245837 A1 * | 12/2004 | Clifford .................. 297/452.26 |
| 2005/0140199 A1 | 6/2005 | Kang et al. |
| 2006/0001307 A1 | 1/2006 | Embach |
| 2007/0096534 A1 | 5/2007 | Davidson |
| 2008/0042482 A1 | 2/2008 | Weiss et al. |
| 2009/0066142 A1 | 3/2009 | Ventura et al. |
| 2009/0085384 A1 | 4/2009 | Galbreath et al. |
| 2009/0146472 A1 | 6/2009 | Galbreath et al. |

OTHER PUBLICATIONS

U.S. Appl. No. 12/870,109, filed Aug. 27, 2010 and entitled "Vehicle Seat Assembly".
U.S. Appl. No. 12/870,080, filed Aug. 27, 2010 and entitled "Vehicle Seat Assembly".
International Search Report and Written Opinion of PCT/US2011/027245 dated May 9, 2011.
Office Action of U.S. Appl. No. 12/722,375 dated Jun. 12, 2012.
Office Action of U.S. Appl. No. 12/870,080 dated Oct. 1, 2012.
Office Action of U.S. Appl. No. 12/870,109 dated Oct. 1, 2012.

\* cited by examiner

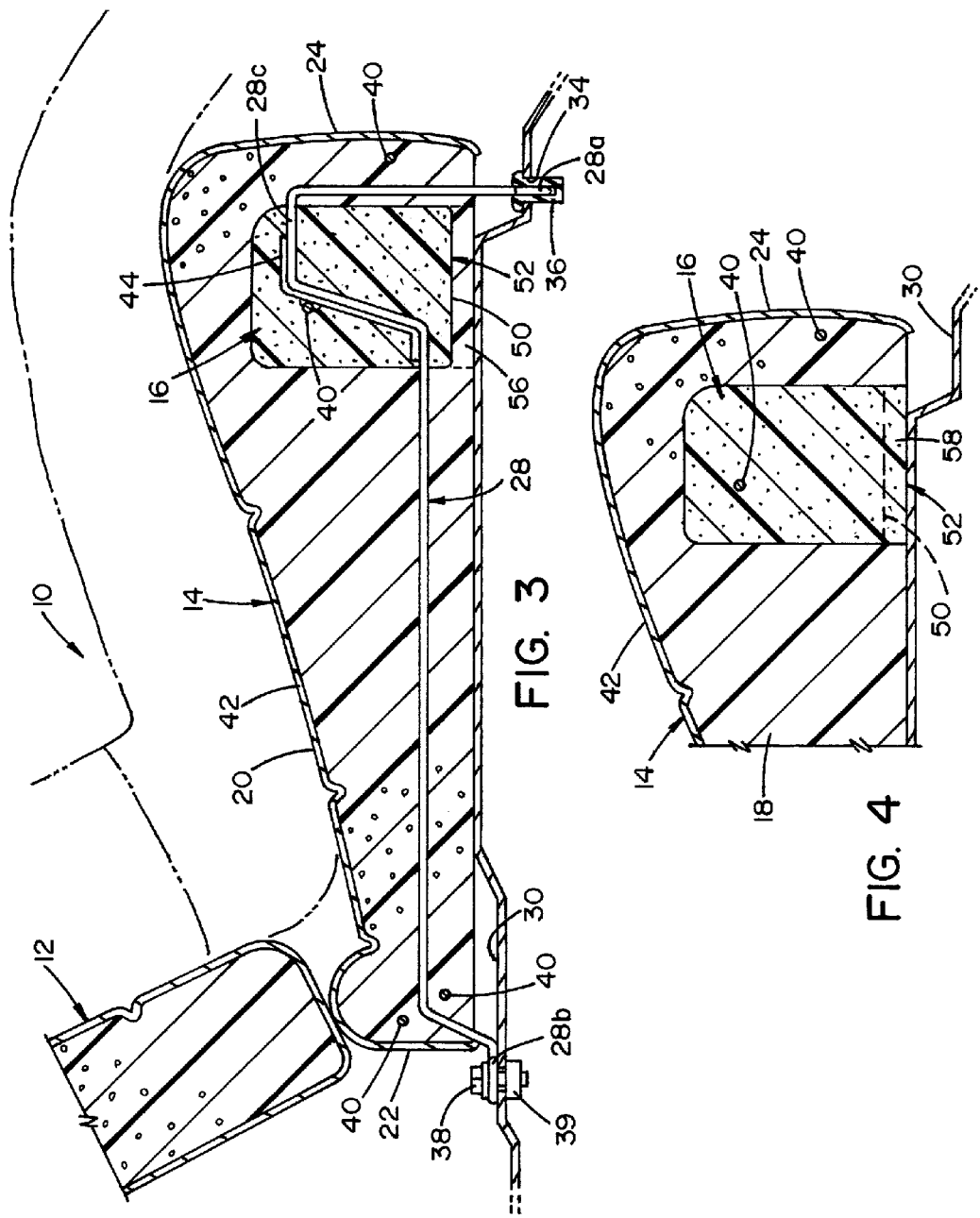

VEHICLE SEAT ASSEMBLY

BACKGROUND

The present disclosure generally relates to a vehicle seat assembly, and more particularly relates to a seat cushion having a rigid member anchored to a vehicle body.

Vehicle seat assemblies typically include a seat cushion fixed to a vehicle body and a seat back extending upwardly from a rearward portion of the seat cushion. In one conventional anti-submarine construction, a forward edge of the seat cushion is raised relative to the rearward edge. For example, a cross member can be provided under the forward edge to elevate it relative to a vehicle floor and the rearward edge of the seat cushion can be mounted directly to the vehicle floor. In this arrangement, the cross member, which can be formed of sheet metal, can absorb submarine loads imparted to the seat cushion during a vehicle collision event.

The seat cushion can comprise a wire frame and a foam member molded over the wire frame. It can be the wire frame of the seat cushion that is connected to the forward cross member. A rear portion of the wire frame of the seat cushion can be bolted or otherwise secured to the vehicle's floor panel or brackets mounted to the floor panel.

Some vehicle manufacturers employ an expanded polypropylene (EPP) foam member in their vehicle seat cushions. However, such seat assemblies often suffer in comfort. This is particularly a problem when minimal space is available between the rear end of the seat cushion and the vehicle body (e.g., the floor panel).

SUMMARY

An example of a vehicle seat assembly that can overcome the aforementioned shortcomings includes a seat back and a seat base extending forward from a lower end of the seat back. The seat base is formed of a first foam member extending laterally across the seat base to absorb loads and a second foam member formed over the first member to form a seating surface of the seat base. The first foam member includes at least one channel for interlocking the first foam member and the second foam member.

In another example, a seat cushion for a seat assembly in a vehicle includes a first foam member extending laterally across the seat assembly and a second foam member molded over the first foam member and extending longitudinally rearward therefrom to form a seating surface. At least one channel is formed in the first foam member for receiving the second foam member to interlock the first and second foam members together.

In a further example, a method of constructing a seat cushion for a vehicle seat assembly is provided. In the method according to this example, a first foam member is molded, the first foam member having a longitudinal length and laterally spaced apart channels disposed along the longitudinal length. The first foam member is overmolded with a second foam member. The second foam member fills the laterally spaced apart channels during overmolding to interlock the second foam member to the first foam member. The second foam member forms a seating surface extending approximately orthogonally from the first foam member relative to the longitudinal length of the first foam member.

BRIEF DESCRIPTION OF THE DRAWINGS

FIG. 3 is a cross-sectional view of the vehicle seat assembly taken along the line 3-3 of FIG. 2.

FIG. 4 is a partial cross-sectional view of the vehicle seat assembly taken along the line 4-4 of FIG. 2.

DETAILED DESCRIPTION

Figure 1:
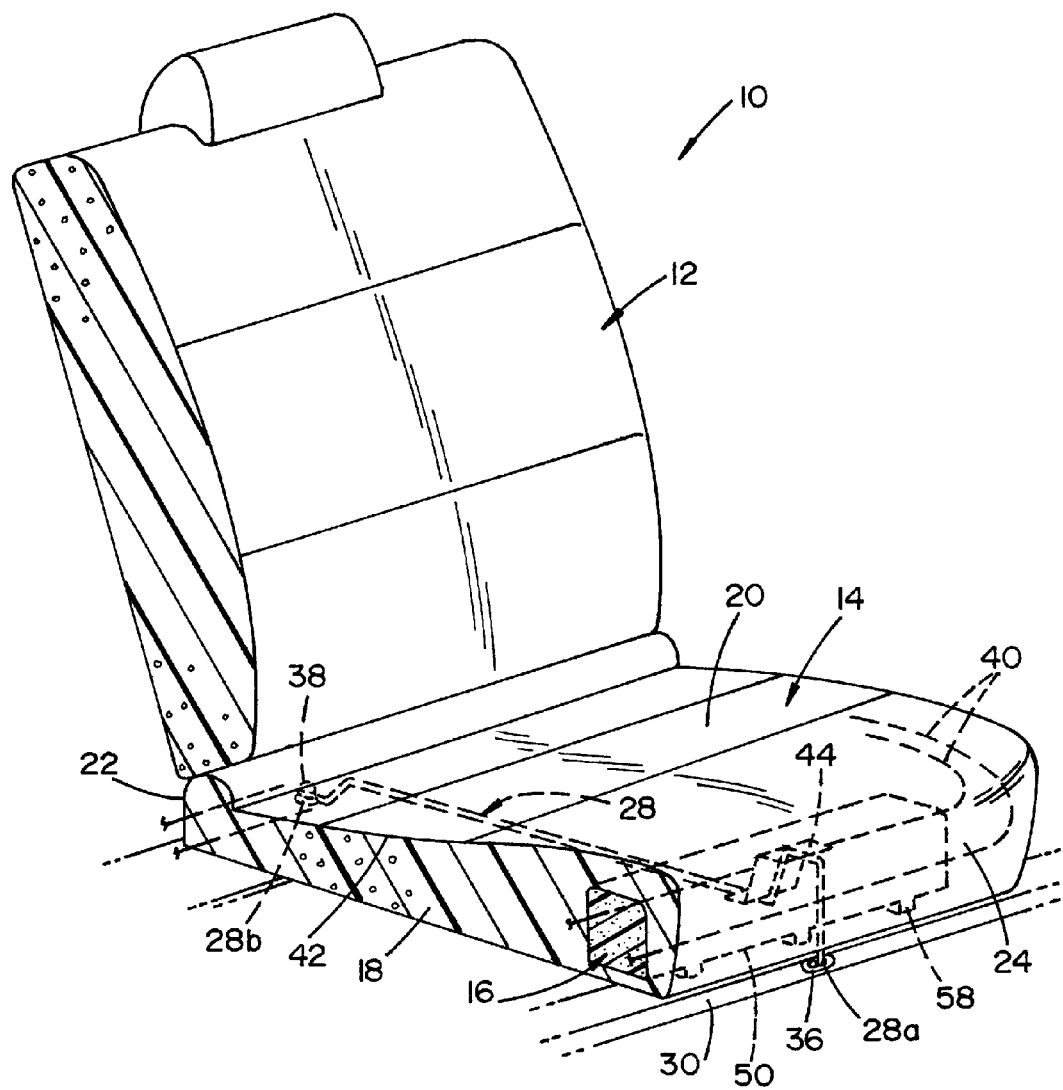
FIG. 1 is a perspective cross-sectional view of a vehicle seat assembly having a first foam member extending laterally across a seat base and a second foam member formed over the first foam member.

Referring to the drawings, wherein the showings are for purposes of illustrating one or more exemplary embodiments and not for purposes of limiting same, FIG. 1 shows a vehicle seat assembly 10 including a seat back 12 and a seat base 14 extending from a lower end of the seat back 12. The seat base 14, which can also be referred to as a seat cushion, includes and is formed of a first portion or member 16 extending laterally across the seat base 14 to absorb loads (e.g., submarine loads) and a second portion or member 18 formed over the first member 16 to form a seating surface 20 of the seat base 14. In particular, the second member 18 extends longitudinally from the first member 14 toward a rear or rear edge 22 of the seat base 14 form the seating surface 20. A trim cover 42 can be received over the first and second members 16, 18, particularly over the second member 18 which is itself received over the first member 16.

In one embodiment, the first member 16 is formed of a relatively rigid material, such as rigid foam, and the second member 18 is formed of a relatively less rigid material, such as a soft or less rigid foam. For example, the relatively rigid material of the first member 16 can be expanded polypropylene (EPP) foam and the relatively less rigid material of the second member 18 can be urethane foam. Providing the first member 16, which is formed of a more rigid material (e.g., EPP foam) along a forward portion 24 of the seat base 14 allows the first member 16 to absorb submarine loads and/or child restraint fixture loads, such as might be generated during a vehicle crash event. Providing the first member 16 only locally adjacent to the forward portion 24 allows comfort of the seat base 14 to be maintained through use of the second member 18 being formed of a less rigid material (e.g., urethane foam), while managing loads developed during a crash event.

As shown in the illustrated embodiment, the first foam member 16 can be an elongated member having a longitudinal length extending laterally across the seat base 14. In particular, the longitudinal length of the first member 16 can correspond closely to a lateral width of the seat base 14, though the first member 16 is slightly shorter. A width of the first member 16, by contrast, can be significantly smaller. For example, as best shown in FIG. 3, the width can be less than fifty percent of the front-to-back dimension of the seat base 14, preferably less than thirty-three percent of the front-to-back dimension, and more preferably approximately twenty-five percent of the front-to-back dimension. A height of the first member 16 can be such that it is nominally shorter than the seat base 14 adjacent the forward portion 24 but higher than the seat base 14 adjacent a rear 22 of the seat base 14.

With additional reference to FIGS. 2-5, the vehicle seat assembly 10 further includes at least one wire frame section (e.g., wire frame sections 26 and 28) secured to the first member 16 and extending rearwardly therefrom toward the rear 22 of the seat base 14 for mounting the seat base to an associated vehicle body (e.g., floor panel 30). As will be described in more detail below, at least one wire frame section can be laterally disposed at a B-location, which is located centrally along a hip point axis of the seat base 14. This can assist in transferring submarine loads or other loads (e.g., those of a child restraint fixture) from the first member 16 to the associated vehicle body at a location adjacent the rear 22 of the seat base 14.

In the illustrated embodiment, the at least one wire frame section of the vehicle seat assembly 10 includes a first wire section 26 and a second wire section 28. Accordingly, a pair of laterally spaced apart wire frame sections 26, 28 are provided in the illustrated embodiment, wherein the wire frame sections 26, 28 are connected to the first member 16 and extend longitudinally therefrom toward the rear 22 of the seat base 14 where the wire frame sections 26, 28 can be secured to the vehicle body component (e.g., floor panel 30). In the illustrated embodiment, the wire frame sections 26, 28 are each disposed centrally (i.e., at a B-location) along a respective hip point axis of the seat base 14.

More particularly, the first wire section 26 can be laterally disposed at a B-location B1 of a first hip point axis A1 of the seat base 14 and the second wire frame section 28 can be laterally disposed at a B-location B2 of a second hip point axis A2 of the seat base 14. As is known and understood by those skilled in the art, each hip point axis of the seat base 14 is located at a vertical location where an expected seat occupant's hip would be located (i.e., the pivot point between the torso and upper leg portions of a seat occupant's body). As used herein, hip point axis is an axis extending in a direction laterally across the vehicle and each hip point axis has a first lateral end and a second lateral end, the distance between the first and second lateral ends being an approximate width of the expected seat occupant. As used herein, B-location is a location disposed centrally along each hip point axis (i.e., located centrally between the first and second lateral ends of each hip point axis).

While the illustrated embodiment includes two wire frame sections 26, 28, it is to be appreciated that the seat base 14 could include only a single wire frame section or could include more than two wire frame sections. For example, in a seat base designed for only one occupant the seat base would have only a single hip point axis with a single B-location or center location defined therealong. Accordingly, only a single wire frame section could be used. In a seat base designed for multiple occupants, the seat base could have a hip point axis located where each occupant is expected to be seated and each hip point axis could have its own B-location or center location. In this arrangement, a wire frame section could be provided at each B-location. Also in the illustrated embodiment, the vehicle body or vehicle body component is illustrated as the floor panel 30; however, it is to be appreciated that the wire frame sections 26, 28 could be secured to some other vehicle body component or to some intermediate component or bracket that is itself secured to the vehicle floor panel 30 or some other vehicle body component.

As shown in the illustrated embodiment, first ends 26a, 28a of the wire frame sections 26, 28 can be secured to the vehicle floor panel 30 adjacent the forward edge 24 of the seat base 14 and second ends 26b, 28b can be secured to the vehicle floor panel 30 adjacent the rearward edge 22 of the seat base 14. Respective portions 26c, 28c can be secured via overmolding to the first member 16 for transferring submarine loads (or other loads, e.g., child restraint device loads) absorbed thereby to the vehicle floor panel 30. In particular, portions 26c, 28c can be formed with an inverted U or V-shape that provides for better interlocking by the overmolded first member 16. As best shown in FIG. 3 with respect to rear end 28b, the rear ends 26b, 28b of the wire frame sections 26, 28 can be secured to the vehicle body component or floor panel 30 adjacent the rear end 22 of the seat base 14. Forward ends 26a, 28a can be secured to the vehicle body component (e.g., floor panel 30) or another vehicle body component (e.g., a bracket mounted to the floor panel 30) adjacent the forward end 24 of the seat base 14 below the first member 16 in the illustrated embodiment.

More specifically, in the illustrated embodiment, the floor panel 30 defines receiving apertures 34 in which the forward ends 26a, 28a are received for connecting to the floor panel 30, though this could be another vehicle body component. In particular, grommets 36 can facilitate connection of the forward ends 26a, 28a to the floor panel 30. To facilitate this connecting, the forward ends 26a, 28a can include hooked portions as shown in the illustrated embodiment. The rearward ends 26b, 28b of the wire frame sections 26, 28 can be formed as looped portions for receipt of bolts 38. In particular, bolts 38 can be received through looped end portions 26b, 28b of the wire frame sections 26, 28 for securing the same to the floor panel 30 (or to another vehicle body component) as best shown with respect to rearward end 28b in FIG. 3. A threaded member, such as nut 39, can be threaded onto the bolt 38 thereby connecting the wire frame section 26 or 28 to the floor panel 30. Of course, other connection means and devices can be used to secure the rearward ends 26b, 28b to the vehicle body component.

The first member 16 can be overmolded onto the wire frame sections 26, 28. In particular, the first member 16 can be overmolded onto the inverted U-shaped portions 26c, 28c of the wire frame sections 26, 28. These portions 26c, 28c can be shaped (as shown in the illustrated embodiment) to facilitate a secure attachment between the overmolded first member 16 and the wire frame sections 26, 28. The second member 18 can then be overmolded onto at least one of the first member 16 and the wire frame sections 26, 28. In the illustrated embodiment, the second member 18 is overmolded onto both the first member 16 and the wire frame sections 26, 28 as will be described in further detail below.

If desired, the vehicle seat assembly 10, and particularly the seat base 14 thereof, can include another wire frame section 40 which is overmolded by the second member 18. In particular, the wire frame section 40 can be provided about a perimeter of the seat cushion or base 14 and provide a structure on which to overmold the second member 18. Additionally, as best shown in FIG. 3, the longitudinally extending wire frame sections 26, 28 can pass through and inter-engage the wire frame 40 adjacent the rear end 22 of the seat base 14.

A plate member 44 can be provided in association with each wire frame section 26, 28. In the illustrated embodiment, each plate member 44 is disposed along a rearward section of the portions 26c, 28c of the wire frame sections 26, 28. The plates 44 function to prevent the wire frame sections 26, 28 from tearing or ripping through the first member 16 during a collision event. In the illustrated embodiment, each plate 44 is secured to the frame 40, such as by welding, though other arrangements are possible. For example, each plate 44 could be welded onto the corresponding wire frame section 26, 28 or otherwise secured in position. Another example would include simply overmolding the plates 44 in their respective positions by the first member 16.

In one known design (not shown), bonding of the second member 18 to the first member 16 occurs through overmolding of the second member 18 to the first member 16. Specifically, the second member 18 is molded around front, top and rear sides of the first member in this known design. While this creates a physical bond between the second member 18 and the first member 16, particularly when the second member 18 is formed of urethane and the first member 16 is formed of EPP foam, the physical bond is not very strong and thus it is relatively easy to separate the two members 16, 18. Of course, such separation between the second member 18 and the first member 16 is not desired in the assembled vehicle seat assembly 10.

Accordingly, the first foam member 16 of the illustrated embodiment includes at least one channel (e.g., channels 50) for interlocking the first member 16 and the second member 18. As already mentioned, the second member 18 is overmolded onto the first member 16. During such overmolding, the channel or channels of the first member 16 receive the second member 18 to interlock the first member 16 and the second member 18 together. According to this construction, the channel or channels formed in the first member 16 are specifically provided for receiving the second member 18 to interlock the first and second members 16, 18 together.

In the illustrated embodiment, a plurality of laterally spaced apart channels 50 is disposed along the longitudinal length of the first member 16. In addition, though not required, the channels 50 can include partial channels 50a laterally disposed at each longitudinal end of the first member 16. In the illustrated embodiment, the plurality of laterally spaced apart channels 50 is disposed on an underside 52 of the first member 16. Each channel 50 of the illustrated embodiment allows the second member 18 to surround the first member 16. That is, the second member 18 surrounds the first member 16 at each of the channels 50. Accordingly, a lateral profile of the second member 18, as illustrated in FIG. 3, fully encapsulates a lateral profile of the first member 16 at each channel 50. An advantage of this arrangement is that the second member 18 is allowed to flow and fully envelope around the first member 16 locally at each of the channels 50.

Figure 2:
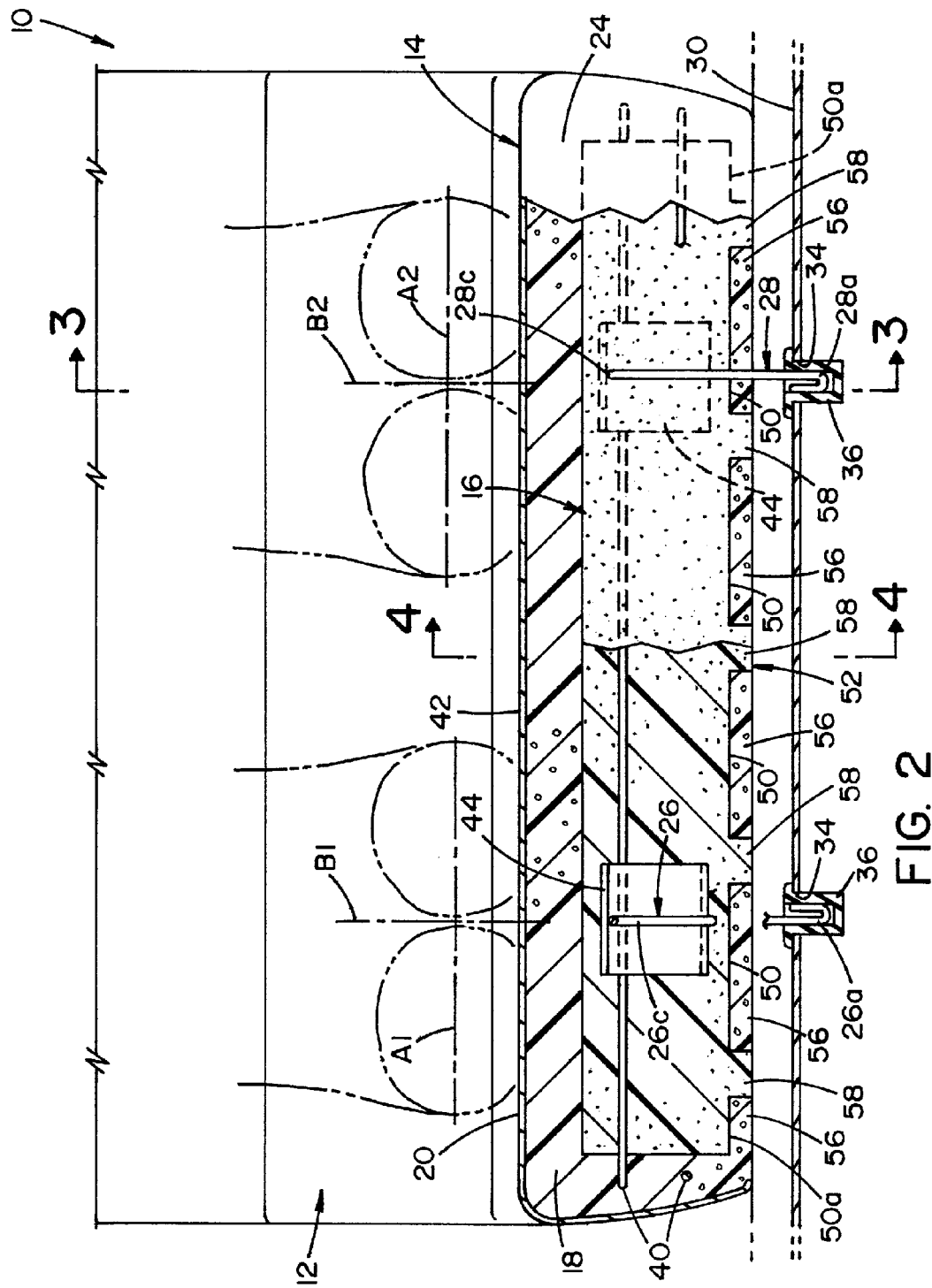
FIG. 2 is a front elevational view, partially in cross section, of the vehicle seat assembly.
Figure 5:
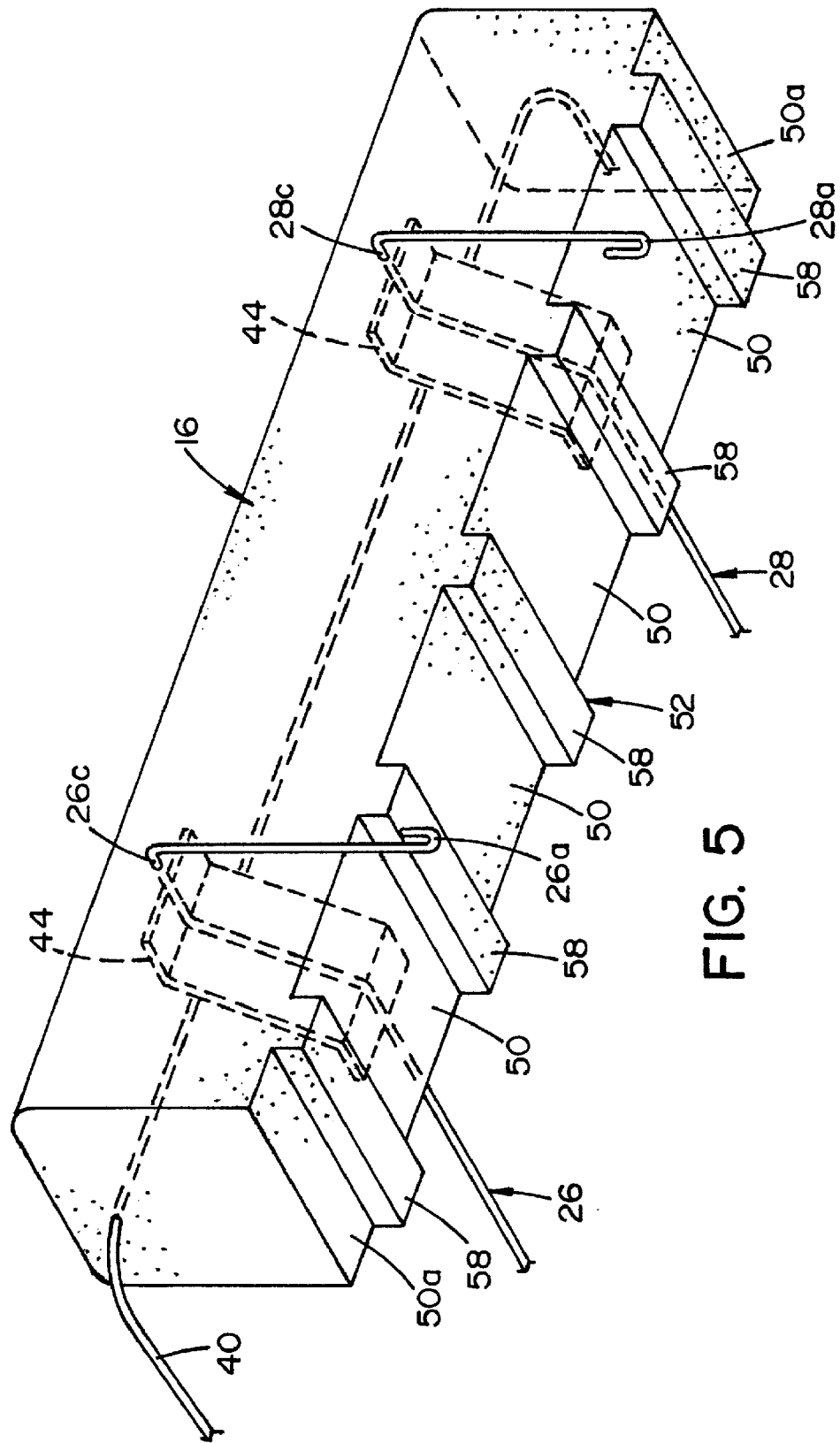
FIG. 5 is a partial perspective view of the seat base shown with the second foam member removed.

As best shown in FIGS. 2 and 3, portions 56 of the second member 18 are received in the channels 50 along the underside 52 of the first member 16. By this arrangement, the first member 16, and particularly portions 58 thereof, contacts the vehicle body component (e.g., floor panel 30) at locations between the channels 50 and the second foam member 18, and particularly portions 56 thereof received in the channels 50, contacts the vehicle body component at locations in registry with the channels 50. Advantageously, reduced contact by the first member 16 and/or increased contact by the second member 18 has the effect of improving noise performance. In particular, undesirable noises, such as squeaks, between the second base 14 and the floor panel 30 are reduced when less of the first member 16 contacts the floor panel 30.

A method for constructing a vehicle seat assembly, and particularly a seat cushion for a vehicle seat assembly, will now be described, such as the vehicle seat assembly 10 of the illustrated embodiment and its seat cushion 14. First, a first foam member is molded having a longitudinal length and laterally spaced apart channels disposed along the longitudinal length. In the illustrated embodiment, the first foam member 16 is molded having its longitudinal length and the laterally spaced apart channels 50 disposed along the longitudinal length. Next, the first foam member is overmolded with a second foam member. In the illustrated embodiment, the first foam member 16 is overmolded with second foam member 18. As already described herein, the second foam member 18 can fill the laterally spaced apart channels 50 during overmolding to interlock the second member 18 to the first member 16. The second member 18 forms the seating surface 20 extending approximately orthogonally from the first member 16 relative to the longitudinal length of the first member 16.

Molding of the first member 16 can include overmolding at least one wire frame section, such as wire frame sections 26 and 28 in the illustrated embodiment, which extend approximately normal relative to the longitudinal length of the first member 16 for transferring loads from the first member to the rear 22 of the seat cushion 14. A trim cover 42 can be installed over the first and second member 16, 18. As already described herein, the first member 16 can be an EPP foam and the second member 18 can be a urethane foam. Also as already described herein, molding of the first member 16 with the laterally spaced apart channels 50 can include forming the laterally spaced apart channels 50 on the underside 52 of the first member 16 such that the second member 18 fully encases the first members 16 at lateral locations corresponding to the laterally spaced apart channels 50.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly, comprising:
   a seat back;
   a seat base extending forward from a lower end of said seat back, said seat base formed of a first foam member extending laterally across said seat base to absorb loads and a second foam member formed over said first member to form a seating surface of said seat base, said first foam member including at least one channel for interlocking said first foam member and said second foam member, wherein said at least one channel includes a plurality of laterally spaced apart channels disposed on an underside of said first foam member, and wherein a lateral profile of said second foam member fully encapsulates a lateral profile of said first foam member at each of said at least one channel.

2. The vehicle seat assembly of claim 1 wherein said second foam member is overmolded onto said first foam member and said at least one channel receives said second foam member to interlock said first foam member and said second foam member together.

3. The vehicle seat assembly of claim 1 wherein said first foam member contacts a vehicle body component at locations between said channels and said second foam member contacts said vehicle body component at locations in registry with said plurality of channels.

4. The vehicle seat assembly of claim 1 wherein said first foam member is formed of a relatively rigid material and said second foam member is formed of a relatively less rigid material.

5. The vehicle seat assembly of claim 4 wherein said relatively rigid material is expanded polypropylene foam and said relatively less rigid material is urethane foam.

6. The vehicle seat assembly of claim 1 further including:
   at least one wire frame section secured to said first foam member and extending rearwardly therefrom to a rear of said seat base for mounting said seat base to an associated vehicle body, said at least one wire frame section transferring loads absorbed by said first foam member to the associated vehicle body.

7. The vehicle seat assembly of claim 6 wherein said seat base has at least one B location and said at least one wire frame section is laterally disposed at said at least one B-location.

8. The vehicle seat assembly of claim 7 wherein said at least one wire frame section includes a first wire section and a second wire section, and wherein said at least one B location includes a first B location and a second B-location, said first wire section laterally disposed at said first B-location and said second wire section laterally disposed at said second B-location.

9. The vehicle seat assembly of claim 7 wherein the second foam member is overmolded directly onto said at least one wire frame.

10. The vehicle seat assembly of claim 1 wherein said first foam member is substantially spaced apart from a rear of said seat base and is disposed only along a forward edge of said seat base.

11. A seat cushion for a seat assembly in a vehicle, comprising:
a first foam member having a longitudinal length extending laterally across the seat assembly;
a second foam member molded over said first foam portion and extending longitudinally rearward therefrom to form a seating surface;
a wire frame section connected to said first foam member and extending longitudinally therefrom toward a rear of said second foam member where said wire frame section is secured to a vehicle body component, said wire frame section having a rear end secured to said vehicle body component adjacent said rear of said second foam member; and
at least one channel formed in said first foam member for receiving said second foam member to interlock said first and second foam members together, wherein said second foam member surrounds said first foam member at said at least one channel.

12. The seat cushion of claim 11 wherein said first foam member is formed of a rigid foam and said second foam member is formed of a less rigid foam.

13. The seat cushion of claim 11 wherein said at least one channel is a plurality of laterally spaced apart channels disposed along said longitudinal length of said first foam member and along an underside of said first foam member.

14. A method of constructing a seat cushion for a vehicle seat assembly, comprising:
molding a first foam member having a longitudinal length and laterally spaced apart channels disposed along said longitudinal length, said laterally spaced apart channels formed on an underside of said first foam member; and
overmolding said first foam member with a second foam member, said second foam member filling said laterally spaced apart channels during overmolding to interlock said second foam member to said first foam member, and said second foam member forming a seating surface extending approximately orthogonally from a rearward end of said first foam member relative to said longitudinal length of said first foam member.

15. The method of claim 14 wherein said molding of said first foam member includes overmolding at least one wire frame section extending approximately normal relative to said longitudinal length for transferring loads from said first foam member to a rear of the seat cushion, said at least one wire frame section extending to a rear of said second foam member for mounting to an associated vehicle body.

16. The method of claim 14 further including:
installing a trim cover over said first and second foam members.

17. The method of claim 14 wherein said first foam member is an expanded polypropylene foam and said second foam member is a urethane foam.

18. The method of claim 14 wherein said second foam member fully encases said first foam member at lateral locations corresponding to said laterally spaced apart channels.

* * * * *